United States Patent Office 3,538,144
Patented Nov. 3, 1970

3,538,144
COLCHICINIC INTERMEDIATES
Jacques Martel, Bondy, Edmond Toromanoff, Paris, and Chanh Huynh, Villemomble, France, assignors to Roussel-UCLAF, Paris, France, a French corporation
No Drawing. Original application Dec. 1, 1964, Ser. No. 415,149, now Patent No. 3,396,188. Divided and this application Oct. 16, 1967, Ser. No. 705,236
Claims priority, application France, Dec. 5, 1963, 956,175
Int. Cl. C07c 69/76
U.S. Cl. 260—473                                    2 Claims

ABSTRACT OF THE DISCLOSURE

Carboxylic acid esters of benzocycloheptene are disclosed as colchicine intermediates.

---

The invention relates to a novel process for the preparation of 2,3,4-trimethoxy-5-(—CH$_2$—CH$_2$—COOR)-6-(2'-cyanoethyl)-8,9-dihydro-7-H-benzocycloheptene wherein R is selected from the group consisting of lower alkyl and ar-lower alkyl. The invention also relates to novel intermediates produced in the said process.

PRIOR APPLICATION

This application is a divisional application of our co-pending, commonly assigned U.S. patent application, Ser. No. 415,149, filed Dec. 1, 1964, now U.S. Pat. No. 3,396,188.

In our copending U.S. patent application Ser. No. 356,048, filed Mar. 31, 1964, now U.S. Pat. No. 3,280,151, there is described a process for the preparation of 2,3,4-trimethoxy - 5-(—CH$_2$—CH$_2$—COOR)-6-(2'-cyanoethyl)-8,9-dihydro-7-H-benzocycloheptene which can be cyclized to form 1,2,3-trimethoxy-9-cyano-10-hydroxy-5,6,7,8,11,12 - hexahydrobenzo-(a)-heptalene, an intermediate for colchicine. The said process, however, required seven steps starting from 2,3,4-trimethoxy-5-(2'-carboxyethyl)-8,9-dihydro-7-H-benzocycloheptene and the double bond in the future B ring of colchicine was lost during the introduction of a lateral chain in its position which required it to be established again by migration of an exocyclic double bond, a difficult and sensitive reaction to perform in the presence of a nitrile group.

It is an object of the invention to provide a novel process for the preparation of 2,3,4 - trimethoxy - 5 - (—CH$_2$—CH$_2$—COOR) - 6 - (2'-cyano-ethyl)-8,9-dihydro-7-H-benzocycloheptene from 2,3,4-trimethoxy-5-(2'-carboxyethyl)-8,9-dihydro-7-H-benzocycloheptene in five steps.

It is another object of the invention to provide a novel process for the preparation of 2,3,4-trimethoxy-5-(—CH$_2$—CH$_2$—COOR) - 6 - (2'-cyano-ethyl)-8,9-dihydro-7-H-benzocycloheptene without introducing a double bond in the cycloheptene ring.

It is another object of the invention to provide novel intermediates for the preparation of 2,3,4-trimethoxy-5-(—CH$_2$—CH$_2$—COOR)-6-(2'-cyano-ethyl)-8,9-dihydro-7-H-benzocycloheptene.

These and other objects and advantages of the invention will become obvious from the following detailed description.

The process of the invention for the preparation of benzocycloheptenes of the formula

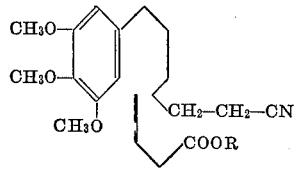

wherein R is selected from the group consisting of lower alkyl of 1 to 7 carbon atoms and ar-lower alkyl comprises selectively formylating a 2,3,4-trimethoxy-5-
(—CH$_2$—CH$_2$—COOR)-
8,9-dihydro-7-H-benzocycloheptene wherein R has the above definition by the Vilsmeier-Haack method to form 2,3,4 - trimethoxy - 5 - (—CH$_2$—CH$_2$—COOR)-6-formyl-8,9-dihydro-7-H-benzocycloheptene, condensing the latter with an easily saponifiable ester of cyanoacetic acid or cyanoacetic acid per se in the presence of an acid and a base to form 2,3,4-trimethoxy-5-(—CH$_2$—CH$_2$—COOR)-6-(2'-COOR'-2'-cyano-vinyl)-8,9-dihydro - 7 - H - benzocycloheptene wherein R' is selected from the group consisting of hydrogen, lower alkyl and ar-lower alkyl, catalytically hydrogenating the latter to form 2,3,4-trimethoxy-5-(—CH$_2$—CH$_2$—COOR) - 6 - (2'-COOR' - 2' - cyano-ethyl)-8,9-dihydro - 7 - H-benzocycloheptene, saponifying the latter under alkaline conditions to form 2,3,4-trimethoxy-5-(2'-carboxyethyl) - 6 - (2'-carboxy - 2' - cyano-ethyl)-8,9-dihydro - 7 - H-benzocycloheptene, saponifying the latter by heating the said compound and esterifying the resulting product to form 2,3,4-trimethoxy-5-(—CH$_2$—CH$_2$—COOR) - 6 - (2'-cyano-ethyl)-8,9-dihydro-7-H-benzocycloheptene wherein R has the above definition. The reaction scheme is illustrated in Table I.

TABLE I

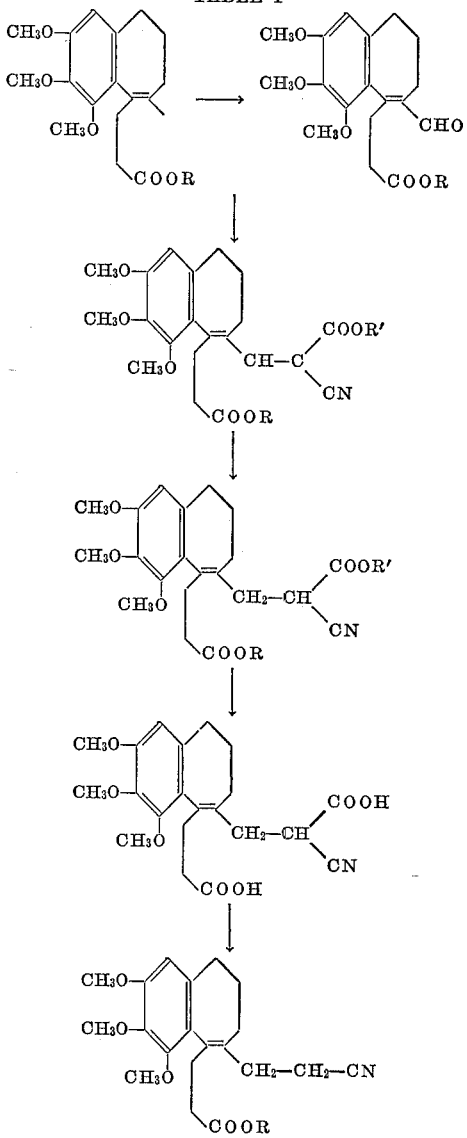

wherein R is selected from the group consisting of lower alkyl and arlower alkyl radicals and R' is selected from the group consisting of hydrogen, lower alkyl and arlower alkyl.

The selective formylation of 2,3,4-trimethoxy-5-(—CH$_2$—CH$_2$—COOR) - 8,9 - dihydro - 7 - H - benzocycloheptene according to the Vilameier-Haack method is preferably effected by reaction with phosphorous oxychloride-N-lower alkyl formanilides such as N-methylformanilide complexes or phosphorous oxychloride-N,N-dilower alkyl formamides such as dimethyl formamide complexes in the absence of a solvent at moderate temperatures preferably about 50 to 60° C. A slight excess of formamide or formanilide is preferred. The reaction is usually complete in a matter of hours, 4 to 5 hours with the phosphorous oxychloride-N-methylformanilide. The selective formylation of the 6-position was unexpected since formylation theoretically could occur solely or simultaneously in the 1-position.

The condensation of 2,3,4 - trimethoxy - 5-(—CH$_2$—CH$_2$—COOR)-6-formyl - 8,9 - dihydro - 7 - H-benzocycloheptene with NC—CH$_2$—COOR' wherein R' is selected from the group consisting of hydrogen, lower alkyl and arlower alkyl is effected in an organic solvent at elevated temperatures, preferably at reflux, in the presence of preferably an organic base such as piperidine, pyridine, a picoline, morpholine, triethylamine, etc. and preferably an organic acid such as acetic acid, propionic acid, etc. Suitable organic solvents are benzene hydrocarbons such as benzene, toluene, etc. A preferred embodiment is refluxing in benzene for a period of about 20 hours with simultaneous azeotropic removal of water.

The catalytic hydrogenation of 2,3,4-trimethoxy-5-(—CH$_2$—CH$_2$—COOR) - 6 - (2' - COOR' - 2' - cyano-vinyl)-8,9 - dihydro - 7 - H - benzocycloheptene is effected preferably in the presence of a palladium or platinum catalyst in a lower alkanol solvent such as methanol or ethanol. It is unexpected that the vinyl grouping is selectively reduced without a 1,4-addition or attack of the nitrile group. The hydrogenation may also be performed without isolation of the said product from prior condensation reaction.

The saponification of the ester groups of 2,3,4-trimethoxy-5-(—CH$_2$—CH$_2$—COOR) - 6 - (2' - COOR'-2'-cyano-ethyl)-8,9-dihydro - 7 - H-benzocycloheptene is effected in the presence of an alkaline base such as an alkali metal hydroxide in an aqueous alcohol medium.

The decarboxylation of 2,3,4-trimethoxy - 5 - (2'-carboxyethyl) - 6 - (2'-carboxy-2'-cyano-ethyl)-8,9-dihydro-7-H-benzocycloheptene may be obtained by heating the said compound in the absence of a solvent to temperatures about 150 to 200° C. for a short period of time, usually one-half hour to one hour. The decarboxylated product can be reesterified with usual esterification agents. To form the methyl ester, it is preferred to use diazomethane or the dimethyl ketal of dimethylformamide [Angewandte Chemie, vol. 75, No. 6, 1963, p. 296].

A preferred embodiment of the process of the invention comprises selectively formylating 2,3,4-trimethoxy-5-(2'-carbomethoxyethyl) - 8,9 - dihydro - 7 - H - benzocycloheptene by reaction with a phosphorous oxychloride - N - methylformanilide complex to form 2,3,4-trimethoxy-5-(2'-carbomethoxyethyl) - 6 - formyl - 8,9 - dihydro - 7 - H - benzocycloheptene, condensing the latter with methyl cyanacetate in the presence of piperidine and acetic acid to form 2,3,4 - trimethoxy - 5 - (2'-carbomethoxyethyl) - 6 - (2' - carbomethoxy-2'-cyano-vinyl)-8,9-dihydro-7-H-benzocycloheptene, catalytically hydrogenating the latter in the presence of a platinum catalyst to form 2,3,4-trimethoxy-5-(2' - carbomethoxyethyl)-6-(2'-carbomethoxy-2'-cyano-ethyl) - 8,9 - dihydro - 7 - H-benzocycloheptene, saponifying the latter in the presence of potassium methanolate to form 2,3,4-trimethoxy-5-(2'-carboxyethyl) - 6 - (2'-carboxy - 2' - cyano - ethyl)-8,9-dihydro -7 - H - benzocycloheptene, heating the latter to 150 to 200° C. to form 2,3,4-trimethoxy-5-(2'-carboxyethyl) - 6 - (2' - cyanoethyl)-8,9-dihydro-7-H-benzocycloheptene and reacting the latter with diazomethane to form 2,3,4-trimethoxy - 5 - (2' - carbomethoxyethyl)-6-(2'-cyano-ethyl) - 8,9 - dihydro - 7 - H - benzo-cycloheptene which can be cyclized to form 1,2,3-trimethoxy 9-cyano - 10 - hydroxy - 5,6,7,8,11,12 - hexahydrobenzo-(a)-heptalene.

In the following example there are described several preferred embodiments to illustrate the invention. However, it should be understood that the invention is not intended to be limited to the specific embodiments.

The synthesis, an object of the present invention, can be effected starting from compounds having other ethers on the aromatic ring A instead of the trimethyl ether.

EXAMPLE

Preparation of 2,3,4 - trimethoxy - 5 - (2'-carbomethoxyethyl) - 6 - (2' - cyanoethyl) - 8,9 - dihydro - 7 - H-benzocycloheptene Step A: Preparation of 2,3,4 - trimethoxy - 5 - (2'-carbomethoxyethyl) - 6 - formyl - 8,9 - dihydro - 7 - H-benzocycloheptene 2 cc. of phosphorous oxychloride were added dropwise under anhydrous conditions to 3.2 cc. of N-methyl formanilide and the mixture was agitated for 45 minutes at room temperature under an atmosphere of nitrogen. After the mixture had solidified into a complex mass, 4.3 gm. of 2,3,4-trimethoxy-5-(2'-carbomethoxy ethyl)-8,9-dihydro-7-H-benzocycloheptene, obtained according to the process described in our copending U.S. application Ser. No. 356,088, were introduced into the mass and then the mixture was heated to an internal temperature of 55–60° C. for 4 hours with agitation. The mixture was then cooled, diluted with anhydrous benzene, poured into a solution of 20 gm. of sodium acetate and 20 cc. of water and the resulting solution was extracted with benzene. The extracts were washed with water, dried and evaporated to dryness under vacuum. Residual solvent was expelled by a stream of nitrogen, and a gum was recovered, which was dissolved in benzene and the solution percolated through alumina, evaporated to dryness under vacuum to obtain 4.75 gm. of resin.

For analysis, the resin was purified in two different manners:

Purification A

The resin was subjected to chromatography through alumina and was eluted with methylene chloride to obtain 2.558 gm. of product which was crystallized from petroleum ether and recrystallized from a mixture of ether and isopropyl ether to obtain 2 gm. of 2,3,4-trimethoxy-5-(2'-carbomethoxyethyl)-6-formyl-8,9 - dihydro - 7 - H-benzocycloheptene having a melting point of 92° C.

This product occurred in the form of colorless prisms insoluble in water and in dilute aqueous acids and alkalis and soluble in most of the usual organic solvents.

Analysis.—$C_{19}H_{24}O_6$: molecular weight—348.37. Calculated (percent): C, 65.6; H, 6.94. Found (percent): C, 65.7; H, 7.0.

This compound is not described in the literature.

Purification B 150 mg. of 2,3,4-trimethoxy-5-(2'-carbomethoxyethyl)-6-formyl-8,9-dihydro-7-H-benzocycloheptene were heated at reflux for 30 minutes with 80 mg. of semi-carbazide hydrochloride in 2 cc. of ethanol, 0.5 cc. of water and a few drops of pyridine. Then, water was added to the mixture, which was then extracted with methylene chloride. The extract was washed with water, dried and evaporated to dryness to obtain 180 mg. of resin. The said product was subjected to chromatography through alumina and was eluted with methylene chloride containing 10% of methanol. The fraction obtained was crystallized from ether to obtain 90 mg. of semicarbazone of 2,3,4-trimethoxy-5-(2′-carbomethoxyethyl)-6-formyl - 8,9 - dihydro-7-H-benzocycloheptene having a melting point of 100–110° C.

This product occurred in the form of colorless prisms insoluble in water and dilute aqueous acids and alkalis and soluble in most of the conventional organic solvents.

This compound is not described in the literature.

358 mg. of the semi-carbazone of 2,3,4-trimethoxy-5-(2′ - carbomethoxyethyl)-6-formyl - 8,9 - dihydro-7-H-benzocycloheptene were heated for 2 hours at 100° C. in 4 cc. of acetic acid, 4 cc. of water and 0.6 cc. of pyruvic acid. Then water was added to the mixture and the mixture was extracted with methylene chloride. The extract was washed with a solution of sodium bicarbonate and then salt water, dried, filtered and evaporated to dryness to obtain 190 mg. of product. 90 mg. of this product when crystallized from isopropyl ether yielded 50 mg. of 2,3,4-trimethoxy-5-(2′-carbomethoxyethyl)-6-formyl - 8,9 - dihydro-7-H-benzocycloheptene having a melting point of 92° C., identical to the compound described in the preceding purification.

It is also possible to purify the 2,3,4-trimethoxy-5-(2′-carbomethoxyethyl)-6-formyl-8,9-dihydro-7 - H - benzocycloheptene by intermediate formation of the corresponding 2,4-dinitrophenylhydrazone having a melting point of 184° C.

This compound is not described in the literature.

Step B: Preparation of 2,3,4 - trimethoxy-5-(2′ - carbomethoxyethyl)-6-(2′-carbomethoxy - 2′ - cyano vinyl)-8,9-dihydro-7-H-benzocycloheptene 525 mg. of 2,3,4-trimethoxy-5-(2′-carbomethoxyethyl)-6 - formyl - 8,9-dihydro-7-H-benzocycloheptene, 150 mg. of methyl cyanacetate, 52.5 mg. of piperidine and 91 mg. of acetic acid were introduced into 15 cc. of anhydrous benzene and then the mixture was heated at reflux for 20 hours. The mixture was then cooled, and after water had been added, it was extracted with ether. The extract was washed with water, dried and evaporated to dryness under vacuum to obtain 695 mg. of resin.

The resin obtained was dissolved in 10 cc. of methanol, and 0.4 cc. of pyridine, 1 cc. of water and 300 mg. of semicarbazide hydrochloride were added to the solution, which was then heated at reflux for 30 minutes. After the methanol was removed and water was added, the solution was extracted with methylene chloride. The extract was washed with water, dried and evaporated to dryness. The resulting resin was subjected to chromatography through alumina and was eluted with methylene chloride to obtain 525 mg. of 2,3,4-trimethoxy-5-(2′-carbomethoxyethyl)6-(2′-carbomethoxy - 2′ - cyano-vinyl)-8,9-dihydro-7-H-benzocycloheptene.

The product was insoluble in water and dilute aqueous acids and alkalis and soluble in most of the usual organic solvents.

This compound is not described in the literature.

Step C: Preparation of 2,3,4 - trimethoxy-5-(2′ - carbomethoxyethyl)-6-(2′-carbomethoxy - 2′ - cyano-ethyl)-8,9-dihydro-7-H-benzocycloheptene 525 mg. of 2,3,4-trimethoxy-5-(2′-carbomethoxyethyl)-6-(2′-carbomethoxy-2′-cyano-vinyl)-8,9-dihydro - 7 - H-benzocycloheptene obtained in the preceding step were dissolved in 2 cc. of ethanol and then 30 mg. of platinum oxide were introduced into the solution. A reduction was effected with hydrogen under normal pressure for 1 hour during which about 30 cc. of hydrogen were absorbed. The solution was then vacuum filtered and the filtrate was evaporated to dryness. The residue was dissolved in methylene chloride and was percolated over alumina and then the solution was distilled to dryness to obtain 499 mg. of 2,3,4-trimethoxy-5-(2′-carbomethoxyethyl)-6-(2′-carbomethoxy-2′-cyanoethyl)-8,9-dihydro-7 - H - benzocycloheptene.

The product was insoluble in water and in dilute aqueous acids and alkalis and soluble in most of the usual organic solvents.

This compound is not described in the literature.

Step D: Preparation of 2,3,4-trimethoxy-5-(2′-carboxyethyl) - 6 - (2′ - carboxy-2′-cyano-ethyl)-8,9-dihydro-7-H-benzocycloheptene 480 mg. of 2,3,4-trimethoxy-5-(2′-carbomethoxyethyl)-6-(2′-carbomethoxy - 2′ - cyano - ethyl)-8,9-dihydro-7-H-benzocycloheptene obtained in the preceding step were dissolved in 14.5 cc. of potassium methanolate, testing 9.7 mg. of KOH/cc., and the solution was left at room temperature for 17 hours under agitation.

After the methanol was removed under vacuum, water was added to the solution which was then extracted with ether, and the extract was washed with water. The aqueous phases were combined, acidified with 2 N hydrochloric acid and extracted with methylene chloride. The extract was washed with water, dried and distilled to dryness to obtain 416 mg. of a resin which was crystallized from isopropyl ether. After recrystallization from methanol, 208 mg. of 2,3,4-trimethoxy - 5 - (2′ - carboxyethyl)-6-(2′-carboxy-2′-cyano - ethyl)-8,9-dihydro-7-H - benzocycloheptene having a melting point of 163° C. were recovered.

The product was insoluble in water and in dilute aqueous acids and soluble in dilute aqueous alkalis and in most of the usual organic solvents.

Analysis.—$C_{21}H_{25}O_7N$; molecular weight—403.42. Calculated (percent): C, 62.52; H, 6.25; N, 3.47. Found (percent): C, 62.5; H, 6.4; N, 3.5.

This compound is not described in the literature.

Step E: Preparation of 2,3,4-trimethoxy-5-(2′-carbomethoxyethyl)-6-(2′-cyano - ethyl) - 8,9 - dihydro-7-H-benzocycloheptene The isopropyl ether and methanol mother liquors obtained by the recrystallization in the preceding step were evaporated to dryness to obtain 145 mg. of a residue. The said residue was heated at a temperature of 180° C. for 30 minutes under agitation and then cooled to obtain 117 mg. of resin. The resin was dissolved in methylene chloride and after 2 cc. of diazomethane were added, the solution was allowed to stand for 10 minutes at a temperature of 5° C. The solution was then filtered and evaporated to dryness to obtain a resin which was subjected to chromatography through alumina and eluted first with benzene and then with methylene chloride. The fraction eluted with methylene chloride was crystallized from isopropyl ether to obtain 25 mg. of 2,3,4-trimethoxy-5-(2′-carbomethoxyethyl)-6-(2′-cyano ethyl)-8,9-dihydro - 7 - H - benzocycloheptene which had a melting point of 70° C. and was identical to the compound described in application Ser. No. 356,048, now U.S. Pat. No. 3,559,350.

The pure crystalline 2,3,4-trimethoxy - (2′ - carboxyethyl) - 6 - (2′ - carboxy-2′-cyano-ethyl)-8,9-dihydro-7-H-benzocycloheptene produced in Step D was also decarboxylated and esterified by the same procedure to obtain a 45% yield of 2,3,4-trimethoxy-5-(2′-carboxyethyl)-6-(2′-cyano-ethyl)-8,9-dihydro - 7 - H-benzocycloheptene. It is also possible and advantageous to directly decarboxylate and esterify the 416 mg. of crude 2,3,4-trimethoxy-5-(2′-carboxyethyl) - 6 - (2′ - carboxy-2′-cyano-ethyl)-8,9-dihydro-7-H-benzocycloheptene to obtain the identical final product.

Various modifications of the process of the invention such as the use of different solvents or reaction temperatures may be made without departing from the spirit or scope thereof and it is to be understood that the invention is to be limited only as defined in the appended claims.

We claim:
1. A compound of the formula
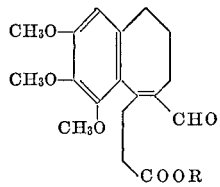
wherein R is selected from the group consisting of lower alkyl and arlower alkyl.
2. 2,3,4-trimethoxy - 5 - (2' - carbomethoxyethyl)-6-formyl-8,9-dihydro-7-H-benzocycloheptene.
References Cited
UNITED STATES PATENTS
3,312,730  4/1967  Winter _____ 260—473
LORRAINE A. WEINBERGER, Primary Examiner
D. E. STENZEL, Assistant Examiner